Figure 1:
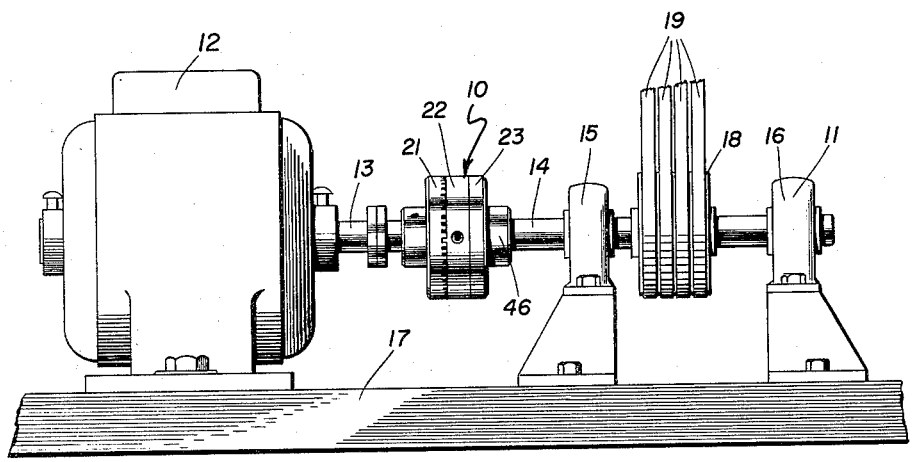

Dec. 1, 1964 W. H. WILSON 3,159,050
DYNAMIC BALANCING APPARATUS

Filed Dec. 11, 1963 2 Sheets-Sheet 1

WILLIAM H. WILSON
INVENTOR.

BY
Norman S. Blodgett

Dec. 1, 1964 W. H. WILSON 3,159,050
DYNAMIC BALANCING APPARATUS
Filed Dec. 11, 1963 2 Sheets-Sheet 2

WILLIAM H. WILSON
INVENTOR.

BY
*Adman S. Blodgett*

United States Patent Office 3,159,050
Patented Dec. 1, 1964

3,159,050
DYNAMIC BALANCING APPARATUS
William H. Wilson, 20 Harrington Terrace,
Burlington, Vt.
Filed Dec. 11, 1963, Ser. No. 329,650
7 Claims. (Cl. 74—573)

This invention relates to a dynamic balancing apparatus and, more particularly, to apparatus arranged to be inserted in a power transmission train to remove vibration due to imbalance.

A problem that is often encountered in connection with rotating machinery is that any slight dynamic imbalance is likely to result, under certain circumstances, in a very large vibration. This vibration can bring about wearing of bearings and ultimate destruction of the machine; in addition, it is the cause of noise which can be a distraction and a psychological danger to persons working near the machinery. In some cases, such vibrations can be removed by use of vibration-damping mounts for the machinery, but this method of solving the problem really represents a process of ignoring the problem, rather than approaching the problem directly and curing its cause. The dynamic imbalance that results in such vibration is not necessarily the result of poor workmanship in the machinery, but often is the result of a wearing of the machinery wtih time, resulting in loose bearings; on the other hand, it may be that the slight imbalance is magnified by the fact that it occurs at a frequency close to the natural frequency of the machinery support. Replacing the bearings can be very expensive and changing the natural frequency of the motor-support assemblage is also very expensive. These and other difficulties experienced with the prior art devices have been obviated in a novel manner by the present invention.

It is, therefore, an outstanding object of the invention to provide a dynamic balancing apparatus which is simple in nature, inexpensive to manufacture, and capable of a long life of useful service with a minimum of maintenance.

Another object of this invention is the provision of a dynamic balancing apparatus which can be applied to existing shafts in power transmission systems or the like with a minimum of disruption to normal operation thereof.

A further object of the present invention is the provision of a dynamic balancing apparatus which is capable of offsetting dynamic imbalance both with respect to the direction and with respect to the amount of imbalance.

It is another object of the instant invention to provide a dynamic balancing apparatus of extremely flexible design which may be applied to a large number of balancing problems.

It is a further object of the invention to provide a dynamic balancing apparatus having independently operable means for adjusting for angular position and for amount of imbalance.

With these and other objects in view, as will be apparent to those skilled in the art, the invention resides in the combination of parts set forth in the specification and covered by the claims appended hereto.

Figure 2:
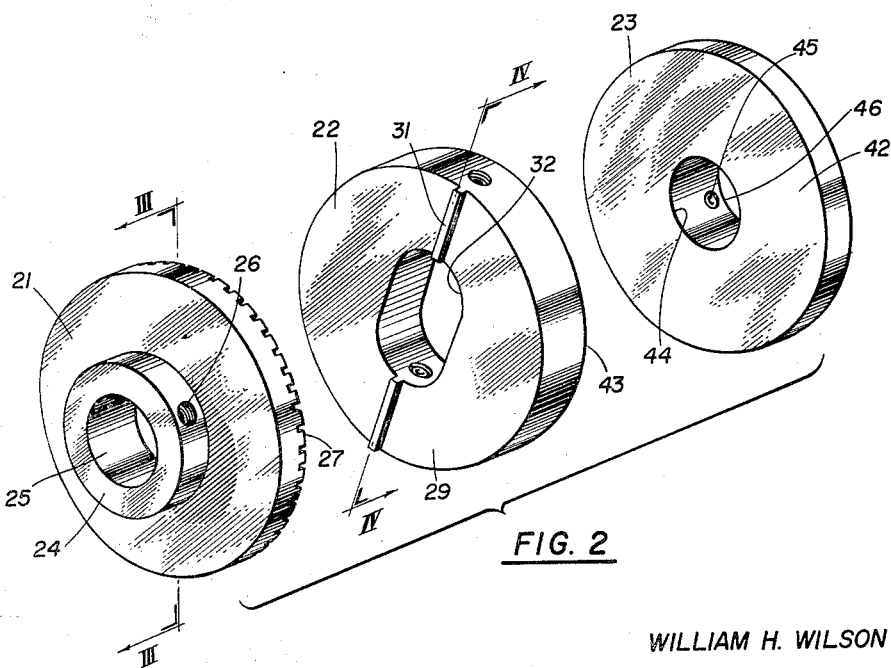
Figure 3:
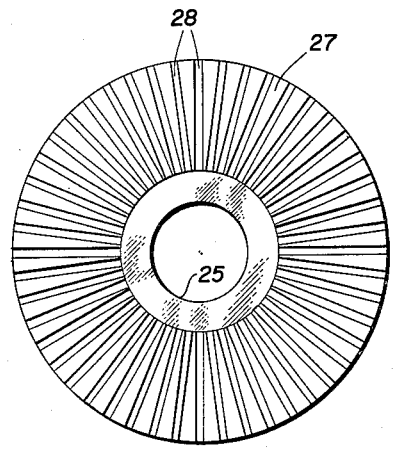
Figure 4:
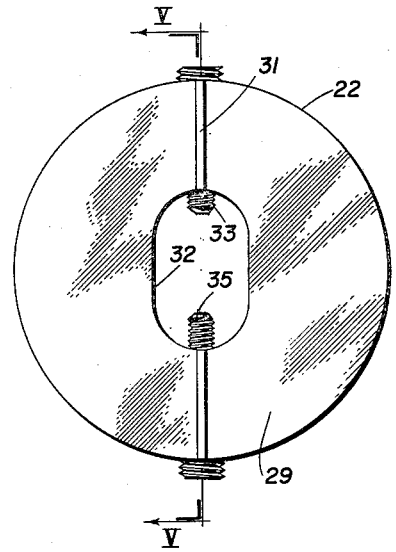
Figure 5:
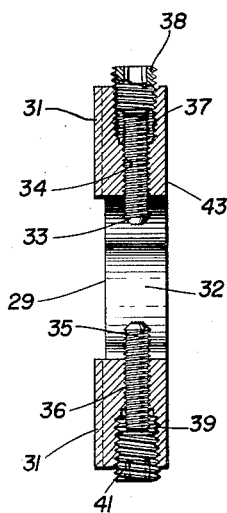

The character of the invention, however, may be best understood by reference to one of its structural forms as illustrated by the accompanying drawings in which:

FIG. 1 is a side elevational view of rotating machinery using a dynamic balancing apparatus embodying the principles of the present invention, FIG. 2 is an exploded perspective view of the balancing apparatus, FIG. 3 is an elevational view of one portion of the apparatus, FIG. 4 is an elevational view of another portion of the apparatus, and FIG. 5 is a sectional view of the apparatus taken on the line V—V of FIG. 4.

Referring first to FIG. 1, wherein are best shown the general features of the invention, the dynamic balancing apparatus, indicated generally by the reference numeral 10, is shown in use in connection with rotating machinery 11. This rotating machinery consists of an electric motor 12, a motor shaft 13, and a transmission shaft 14 mounted in pedestal bearings 15 and 16. The pedestal bearings 15 and 16 and the motor 12 are mounted on a base 17. A multi-groove pulley 18 is keyed to the transmission shaft 14 between the bearings 15 and 16 and drives a load (not shown) through belts 19.

In FIG. 2 it can be seen that the dynamic balancing apparatus 10 consists of a first body member 21, a second body member 22, and a third body member 23, all members being normally mounted in juxtaposition, as shown in FIG. 1.

The first body member 21 is particularly well shown in FIGS. 2 and 3. It is generally disc-like in configuration and is adapted to lie concentric to the shaft 14 on which it is mounted. For the purpose of mounting on the shaft, it is provided with a hub 24 having a concentric coaxial bore 25 extending axially therethrough. This bore is selected to be the same diameter as the shaft 13 and to fit fairly tightly on it; otherwise, an adaptor sleeve would be used. The hub is provided with a threaded set screw opening 26 by which the first member is locked in place on the shaft 14. The side of the first body member away from the hub 24 is provided with a flat radial face 27 in which are formed a plurality of diametrical grooves 28. These grooves extend radially away from a recess in the vicinity of the bore 25 and for each groove 28 on one side of the face there is an aligned groove 28 on the other side. These grooves are spaced apart at slight angles to one another and the grooves are of rectilinear cross-section.

The construction of the second body member 22 is well shown in FIGS. 2, 4, and 5. To begin with, this member is of generally disc conformation and is provided with a flat face 29 which is adapted to face toward and come into contact with the face 27 of the first body member 21. This face is provided with a diametrical spline 31 which has the same cross-section as each of the grooves 28 and is adapted to fit tightly therein. Through the center of the second body member 22 is an aperture 32 of generally elongated shape. Its width is approximately the same as the diameter of the bore 25, while its length is approximately twice the width. The lengthwise direction, incidentally, extends in the same line as the spline 31. Extending through one side of the body member in alignment with the spline 31 and with the lengthwise direction of the aperture 32, is a set screw 33 residing in a threaded bore 34. Similarly, from the other side of the body member and also aligned with the spline 31 is a set screw 35 residing in a threaded bore 36. Outwardly of the threaded bore 34 is a larger threaded bore 37 in which resides a lock screw 38. Similarly, the threaded bore 36 is provided with an enlarged threaded bore 39 in which resides a locking screw 41. The larger threaded bore 37 is of opposite hand from the threaded bore 34, while the enlarged threaded bore 39 is of opposite hand from the threaded bore 36.

The third member 23 is provided with a broad, flat face 42 which is adapted to lie against a similar flat face 43 formed on the second body member 22 opposite the flat face 29. The third member is provided with a bore 44 and a hub 46 through which extends a set screw 45. Each of the three body members 21, 22, and 23 is of generally disc-like shape and all are of the same diameter.

The operation of the invention will now be readily understood in view of the above description. The dynamic balancing apparatus 10 may be used in the center of a solid shaft in the manner shown in FIG. 1. In FIG. 1, the shaft 14 extends through the bore 25 of the first body member. The transmission shaft 14 extends through the bore 44 in the third body member and entirely through the aperture 32 and the second body member 22. Now, assuming that there is an imbalance in the transmission part represented by the shafts 13 and 14, it is necessary in dynamic balancing to provide a weight equal to the weight of the imbalance at a point which is usually opposite in direction to the imbalance. The present apparatus is capable of performing the operation of providing not only the amount required but also positioning angularwise in the proper location. The first body member 21 is locked tightly to the shaft 13, while the second body member 22 is normally locked on the shaft 14. Once an imbalance has been recognized, then the adjustment may be made by loosening and removing the locking screws 38 and 41 from the second body member and adjusting the set screws 33 and 35 to cause the second body member 22 to be non-concentric. It will be understood that loosening one set screw and tightening the other will cause a movement of the second body member 22 in the direction of the loosened set screw and, since these are in alignment with the spline 31 and the spline is slidable in whatever groove 28 it happens to be in, the motion is able to take place. In order to perform this operation, it is probably not necessary to loosen the third body member 23.

Now, it is immaterial how much imbalance is introduced at this point in the proceedings. It is then necessary to loosen the third member 23 by loosening the set screw 45 and sliding it along the shaft 14 slightly. It is then possible to pull the second body member 22 axially to remove the spline 31 from the groove 28 in which it has been residing. The second body member 22 is then rotated through an extremely large angle to place it in a different position relative to the first member 21; then the third member 23 is brought up tight and the three are locked in place again and the machinery is run to see whether this operation has decreased the amount of vibration. By a trial and error or by use of a stroboscope it will be possible to determine an exact angle or an exact groove 28 in which the spline 31 must reside in order to produce the least vibration. When this has been accomplished, the angularity of the imbalance of the second body member 22 is exactly opposite to the imbalance inherent in the transmission system. Then, the exact amount of imbalance of the second member 22 is determined also by trial and error. It will be possible, by feeding the set screws 33 and 35 back and forth, to cause the second body member 22 to be more or less eccentric and there will be one position of eccentricity in which the vibration will be least. When this position has been determined, the lock screws 38 and 41 are put back in place to lock the set screws 33 and 35. In this way, the second body member 22 has been made eccentric by an amount exactly equal to the weight of eccentricity of the imbalance in the transmission system, and this imbalance is at a position relative to the axis of the shaft which is exactly opposite to the imbalance, so that the two should balance one another out. This is the purpose for which the apparatus was designed and it can be seen that relatively simple manipulations will produce a balance of the transmission system. It will be understood that the apparatus of the present invention can be applied with a minimum of change to the center of a solid shaft or to the extreme end of a shaft.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A dynamic balancing apparatus for use on a rotatable shaft, comprising
   (a) a first body member of disc-like configuration adapted to be fastened to the rotatable shaft coaxial thereof,
   (b) a second body member also of disc-like configuration, the body members having flat faces adapted to lie in contact with one another,
   (c) means including radial grooves on the flat face of one of the body members and a single radial spline on the other for locking the body members against rotation relative to one another while permitting relative radical movement between the body members, and
   (d) means for adjusting the radial position of one body member relative to the other.

2. A dynamic balancing apparatus as recited in claim 1, wherein the means for adjusting consists of two opposed radially-extending set screws, the centerlines of the set screws lying in a plane passing through the said spline and through the axis of the rotatable shaft.

3. A dynamic balancing apparatus as recited in claim 2, wherein a locking screw of opposite hand is associated with each set screw.

4. A dynamic balancing apparatus as recited in claim 1, wherein the first body member is adapted to be mounted concentrically of the rotatable shaft and the second body member is provided with an elongated aperture through which the shaft extends.

5. A dynamic balancing apparatus as recited in claim 4, wherein the grooves are diametrical and the spline fits tightly in any one of the grooves and extends diametrically across the second body member in the direction of elongation of the aperture.

6. A dynamic balancing apparatus as recited in claim 5, wherein a set screw extends inwardly from each of two diametrically-opposite points on the periphery of the second body member, the set screws being aligned with one another and extending in the direction of the spline and of the elongation of the aperture.

7. A dynamic balancing apparatus as recited in claim 1, wherein a third body member is provided adapted to be fastened to the rotatable shaft on the side of the second body member opposite the first body member, the second and third body members having flat faces which contact one another in sliding relationship.

References Cited by the Examiner

UNITED STATES PATENTS

| 1,730,019 | 10/29 | Trumpler | 73—469 |
| 1,980,693 | 11/34 | Newman et al. | 74—573 |
| 2,459,947 | 1/49 | Leflar | 74—573 |
| 2,723,555 | 11/55 | Hunter | 73—458 |
| 2,779,196 | 1/57 | Hemmeter | 73—458 |
| 3,074,293 | 1/63 | Langsetmo | 74—573 |

FOREIGN PATENTS 395,497   7/33   Great Britain.

RICHARD C. QUEISSER, *Primary Examiner.*

JAMES GILL, *Examiner.*